(12) United States Patent
Lutzka et al.

(10) Patent No.: US 10,363,801 B2
(45) Date of Patent: Jul. 30, 2019

(54) TONNEAU COVER ACCESS PANEL

(71) Applicant: Bestop, Inc., Louisville, CO (US)

(72) Inventors: Tavis Lutzka, Rochester Hills, MI (US); Stephen J. Lewis, Harrison Township, MI (US); David A. Smith, Macomb Township, MI (US)

(73) Assignee: Bestop, Inc., Louisville, CO (US)

( * ) Notice: Subject to any disclaimer, the term of this patent is extended or adjusted under 35 U.S.C. 154(b) by 92 days.

(21) Appl. No.: 15/342,761

(22) Filed: Nov. 3, 2016

(65) Prior Publication Data

US 2017/0120736 A1    May 4, 2017

Related U.S. Application Data

(60) Provisional application No. 62/250,290, filed on Nov. 3, 2015.

(51) Int. Cl.
  *B60J 7/14* (2006.01)
  *B60J 7/185* (2006.01)
  *B60J 7/10* (2006.01)

(52) U.S. Cl.
  CPC .............. *B60J 7/141* (2013.01); *B60J 7/102* (2013.01); *B60J 7/185* (2013.01); *B60Y 2304/03* (2013.01); *B60Y 2304/05* (2013.01)

(58) Field of Classification Search
  CPC ............ B60J 7/141; B60J 7/102; B60J 7/185

USPC ...................................................... 296/100.16
See application file for complete search history.

(56) References Cited

U.S. PATENT DOCUMENTS

| | | | |
|---|---|---|---|
| 4,813,734 A | 3/1989 | Hoover | |
| 5,263,761 A | 11/1993 | Hathaway et al. | |
| 6,257,647 B1 | 7/2001 | Ninness et al. | |
| 6,322,129 B2* | 11/2001 | Huotari | B60J 7/10 296/100.15 |
| 6,948,760 B2 | 9/2005 | Marx et al. | |
| 2004/0195858 A1 | 10/2004 | Martin | |
| 2011/0169296 A1* | 7/2011 | Schrader | B60J 7/102 296/100.15 |
| 2012/0025560 A1 | 2/2012 | Huotari et al. | |
| 2016/0304024 A1 | 10/2016 | Beltowski et al. | |

* cited by examiner

*Primary Examiner* — Joseph D. Pape
(74) *Attorney, Agent, or Firm* — Warn Partners, P.C.

(57) ABSTRACT

A tonneau cover access panel assembly connectable to a tonneau cover assembly that eliminates the need for side rails to both locate and tension the top cover. The tension works to seal out environmental elements and holds the tonneau cover and locating bows of the tonneau cover in place. The tonneau cover access panel holds the rear of the tonneau in the closed tension state keeping the tonneau secured and tight until the cover is opened by an operator. The tonneau cover access panel assembly is movable between a closed position and a fully open position, and, is movable between at least a first open position and the closed position for more limiting access to the cargo bed of the vehicle when desired. The tonneau cover access panel assembly also reduces weight and complexity.

17 Claims, 16 Drawing Sheets

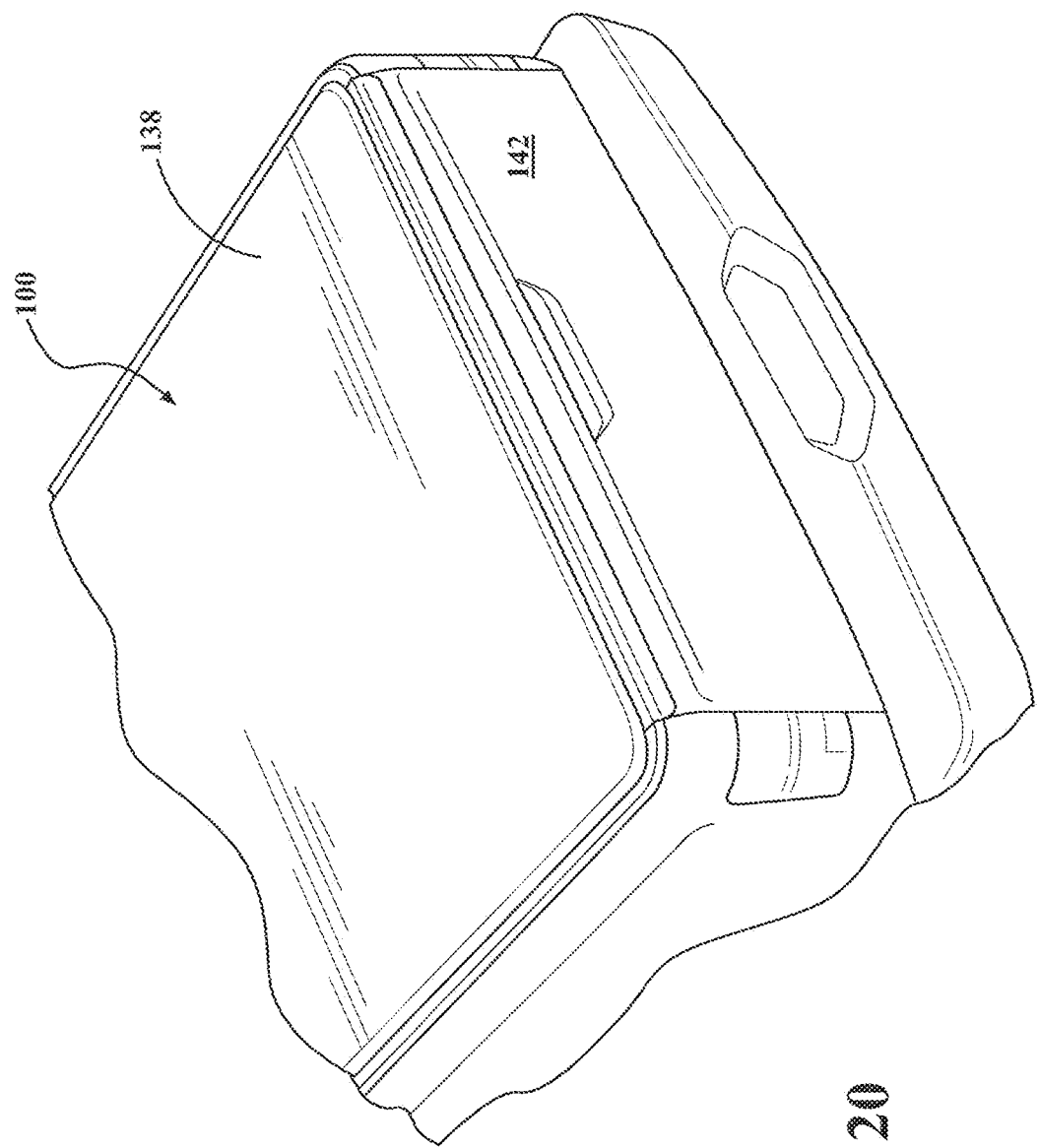

TONNEAU COVER ACCESS PANEL

CROSS REFERENCE TO RELATED APPLICATIONS

This application claims the benefit of U.S. Provisional Application No. 62/250,290, filed Nov. 3, 2015. The disclosures of the above application are incorporated herein by reference.

FIELD OF THE INVENTION

The present invention relates to a pivotable bed cover closeout device for a cargo bed of a vehicle which is movable to desired positions.

BACKGROUND OF THE INVENTION

Removable or stowable soft tonneau covers for pickup vehicles are known in the art. These tonneau covers provide a vehicle with access to the cargo bed when the cover is pulled/folded back or removed, or, provides protection from the elements with the tonneau cover on/deployed. Such tonneau covers are typically manually unlatched on both sides before being moved into the desired positions.

Currently, tonneau covers have a rail that must be mounted down each side of the pickup box to give the cover a place to attach and seal out the elements. Typically, the rails are aluminum and/or the cover is a fabric cover. These side rails also act as a locator, aligning the bows/top cover as it is installed and positioned and provide a way to tension the top cover. Having to install these rails leads to additional height on the vehicle, cost, a non-cohesive look, and addition weight/complexity in the top.

There are other tonneau systems that are labeled as "low profile" to help fight the height and non-cohesive look. However, these covers still use an additional rail to mount the cover to the pickup bed and gain fabric tension so the design is no different than a "conventional" tonneau cover, it is just a different geometry.

Therefore, there remains a need for a system that eliminates the need for side rails, that utilizes an add-on bracket and/or an integrated bed design as an attachment method, eliminates the need of an additional attachment to gain tonneau cover tension, and provides easy multiple position accessibility into the cargo bed.

SUMMARY OF THE INVENTION

A tonneau cover assembly incorporating a cable-type system or any other type of suitable system that tensions a top cover, providing tension along the side of the cover to seal the cover to a bedside of a vehicle. When cables are used, the cables running down either side of the cover solves many of the aforementioned issues. Using a cable running fore and aft on the pickup truck or sport utility (SUV) vehicle bedside eliminates the need for the side rails to both locate and tension the top cover. The cable tension works to seal out the elements and holds the tonneau cover and bows in place.

With a rear engagement feature according to an embodiment of the present invention, it is readily implementable both as an add on bracket or as an integrated feature in a pickup truck bed or SUV or adapted to any other vehicle type. A rear latching system holds the tonneau in the closed tension state keeping the tonneau secured and tight until the cover is opened by an operator.

Optionally, an integrated boot cover is also sewn into the top cover at the front so that when the tonneau cover is rolled up in the stowed position, the boot cover can wrap and protect the top cover.

Preferably, according to an embodiment of the present invention, pockets are provided to hold the ends of center management bows to set the height and eliminate aluminum rails and attachment features. When the top cover is fabric or other flexible material these pockets, e.g., made of acrylonitrile butadiene styrene (ABS) having predetermined suitable thickness, are preferably sewn to the underside surface of the cover.

The tonneau cover assembly is mounted at a predetermined location in sealing engagement with a tailgate and is pivotable between at least a closed position sealing off with the vehicle tailgate, and a partially open position folded rearward to gain access into the cargo bed. When in the partially open position the opening into the bed is limited to provide the predetermined desired amount of accessibility to the bed, e.g., creates about a 6 inch opening for access. This has significant benefits, including, security, ease of stowing and accessing items near the tailgate, eliminating the need to fully open the tailgate and/or move the entire cover to access the bed, quicker access to the bed, and expedient cargo holding, e.g., hauling longer items such as wood planks extending through the opening and into the cargo bed. Intermediate open position(s) is/are also contemplated.

The tonneau cover assembly is also movable between the closed position, partially open position, and a fully open position for full access to the cargo area, according to an embodiment of the present invention. Intermediate position(s) is/are also contemplated.

The tonneau cover assembly reduces weight and complexity, and eliminates the side rails when compared to current tonneau systems.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 20 is a perspective view of an exemplary tonneau cover access panel assembly depicted in an environment of use on a vehicle, according to an embodiment of the present invention.

DETAILED DESCRIPTION OF THE PREFERRED EMBODIMENTS

Figure 1:
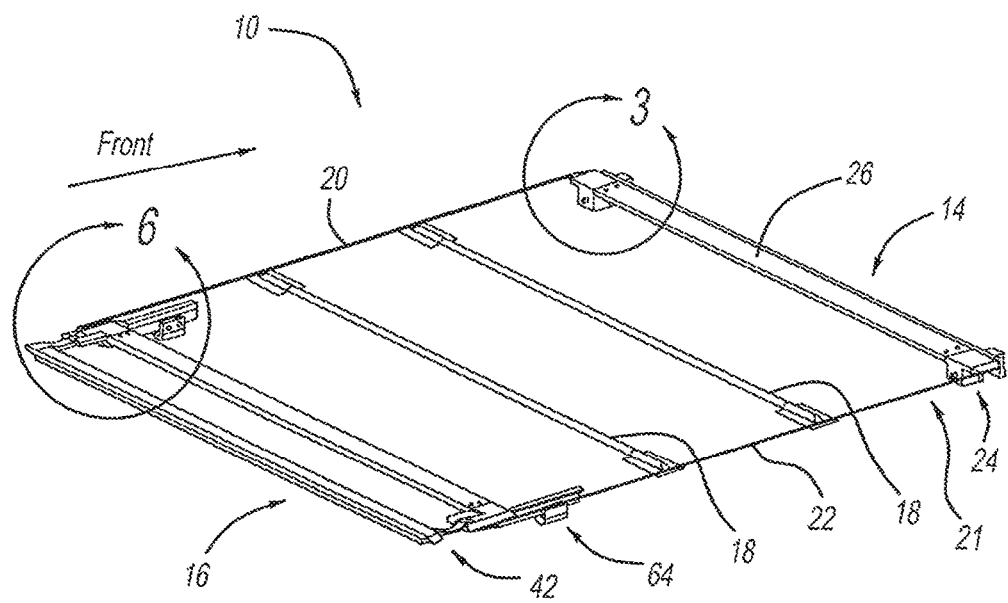
FIG. 1 is right hand perspective view of a tonneau cover assembly according to the present invention, with the cover material omitted for clarity.
Figure 2:
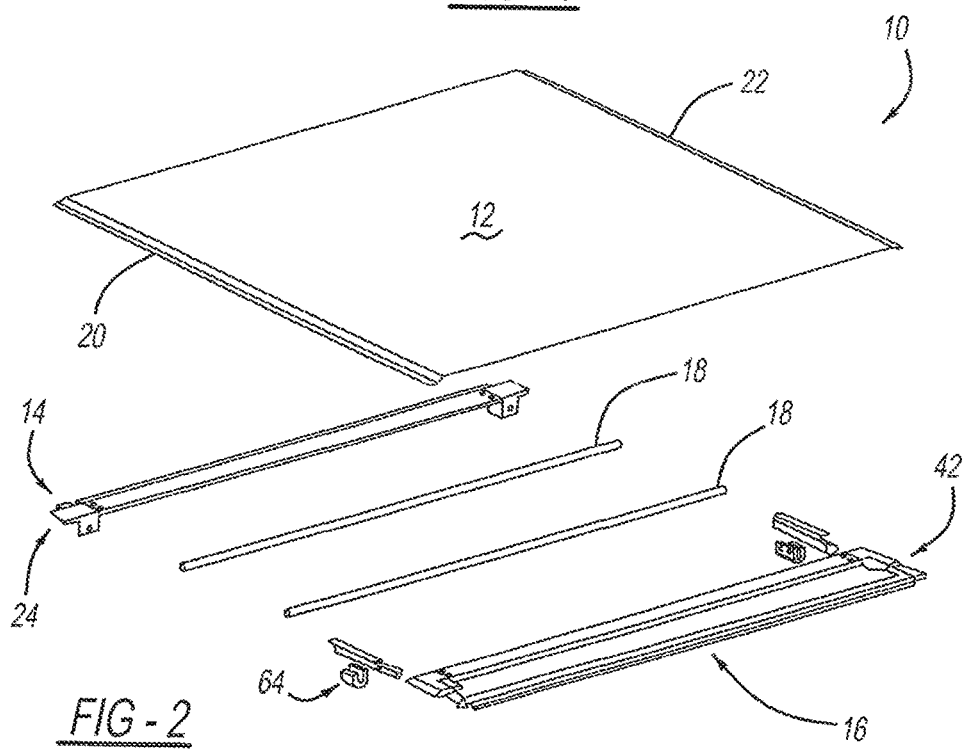
FIG. 2 is a partially exploded view of the tonneau cover assembly of FIG. 1 shown from the left side, in accordance with the present invention.

The following description of the preferred embodiment(s) is merely exemplary in nature and is in no way intended to limit the invention, its application, or uses.

Referring to FIGS. 1-8 generally, there is provided a rear attachment assembly (or "tonneau cover access panel assembly") shown generally at 16 illustrated with an exemplary tonneau cover assembly shown generally at 10 that is a cable-type system. The tonneau cover assembly has a cover 12, e.g., fabric material, soft or flexible material, vinyl or any other suitable material and combinations thereof depending on the application. The tonneau cover assembly 10 also has a front attachment assembly 14, and a at least one, preferably, a plurality of cover management bows 18. These cover management bows 18, most preferably, two bows, are center fabric management bows located between the front attachment assembly 14 and rear attachment assembly 16 running cross bed. For example, the bows 18 help manage the movement of the cover 20 to fold during stowage, etc.

The tonneau cover assembly 10 is provided with a cable tensioning system including at least a first tension cable 20 and a second tension cable 22. The cables are of the same or different predetermined suitable type(s) and diameter(s) for providing predetermined tension and tension release forces, dependant on the application. Other tensioning systems are contemplated depending on the application without departure from the scope of the present invention.

The front attachment assembly 14 includes a pair of front attachment portions 24 each connected to the respective ends of a first bow 26 that is a front bulkhead bow. The front attachment blocks 24 provide a no drill attachment toward the bulkhead of the cargo bed. An attachment arm 28 is operably connected to either of the front attachment blocks 24 for attaching the front of the assembly 10, as will be explained in greater detail below. A cable attachment feature 30, e.g., with a first aperture, is formed in either of the front attachment blocks 24 allowing for mounting locations for the cable tensioning system. The first aperture preferably is formed on this outward feature of both of the front attachment blocks 24 for connecting both the first and second tension cables 20, 22. The attachment arm 28 sets side-to-side and draws the attachment arm 28 to the front. Preferably, the attachment arm 28 slides on and a fastener, e.g., screw, draws the attachment arm 28 to the front, in the direction of the cab.

Figure 3:
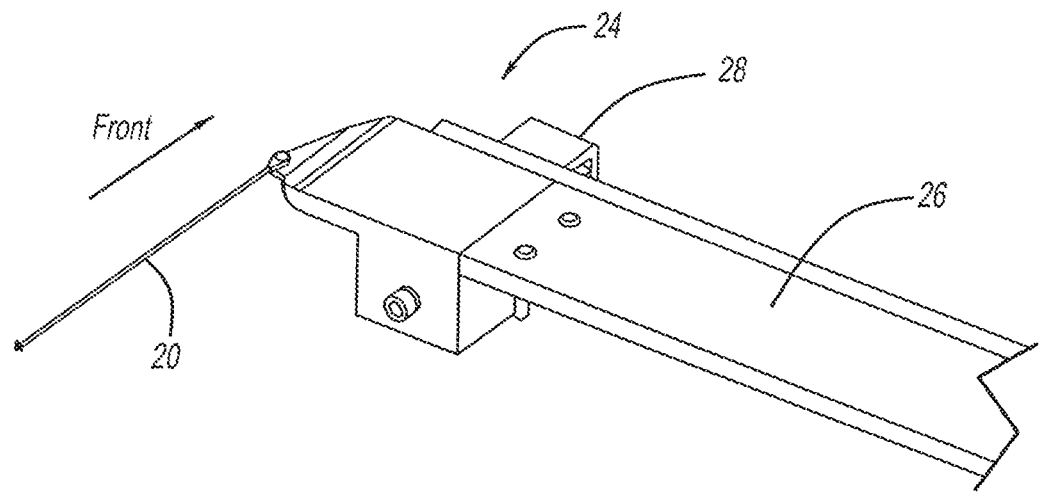
FIG. 3 is an enlarged rear perspective view of a front attachment assembly connected to a first bow and a first tension cable of FIG. 1, in accordance with the present invention.
Figure 4:
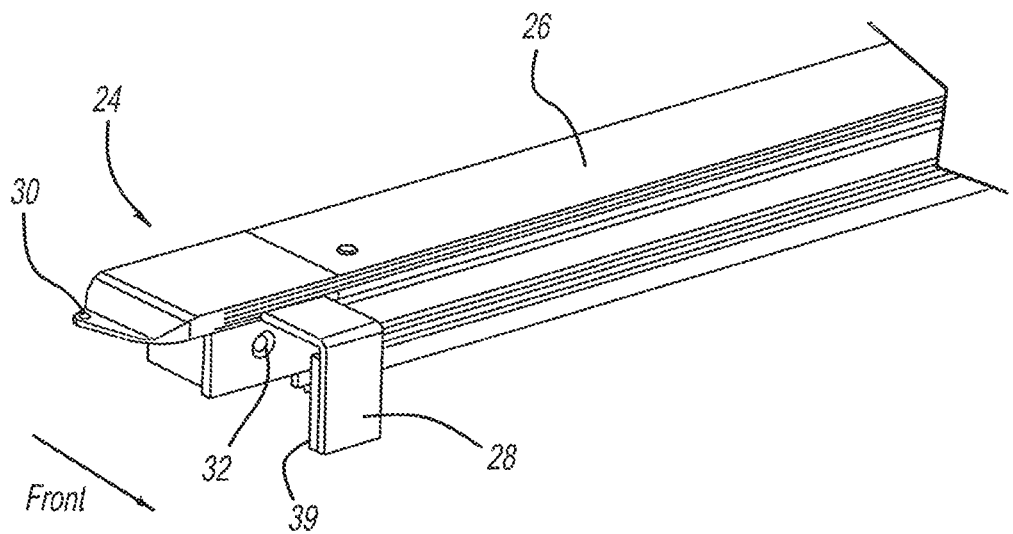
FIG. 4 is an enlarged front perspective view of the front attachment assembly connected to the first bow, in accordance with the present invention.
Figure 5:
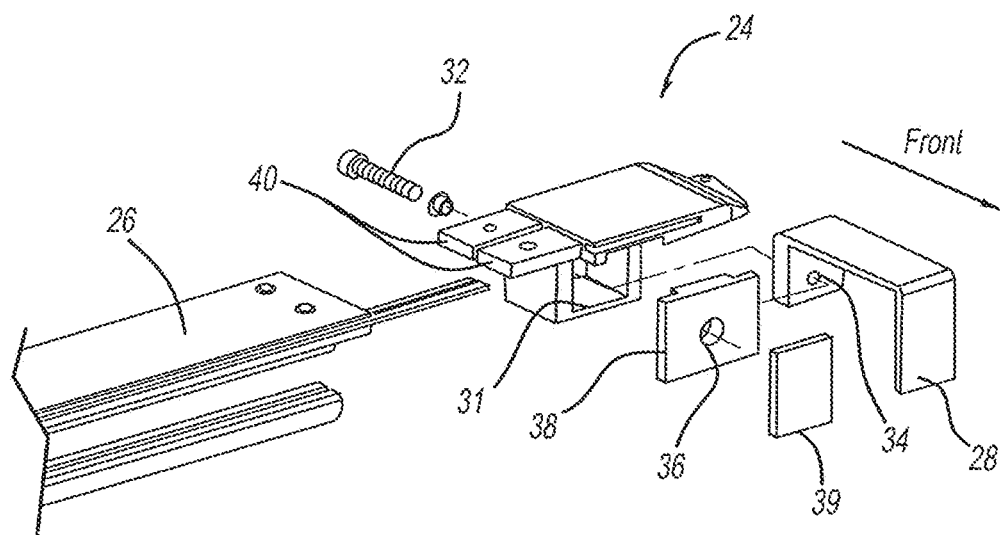
FIG. 5 is a partially exploded front view of the front attachment assembly of FIGS. 3-4 and the first bow, in accordance with the present invention.
Figure 6:
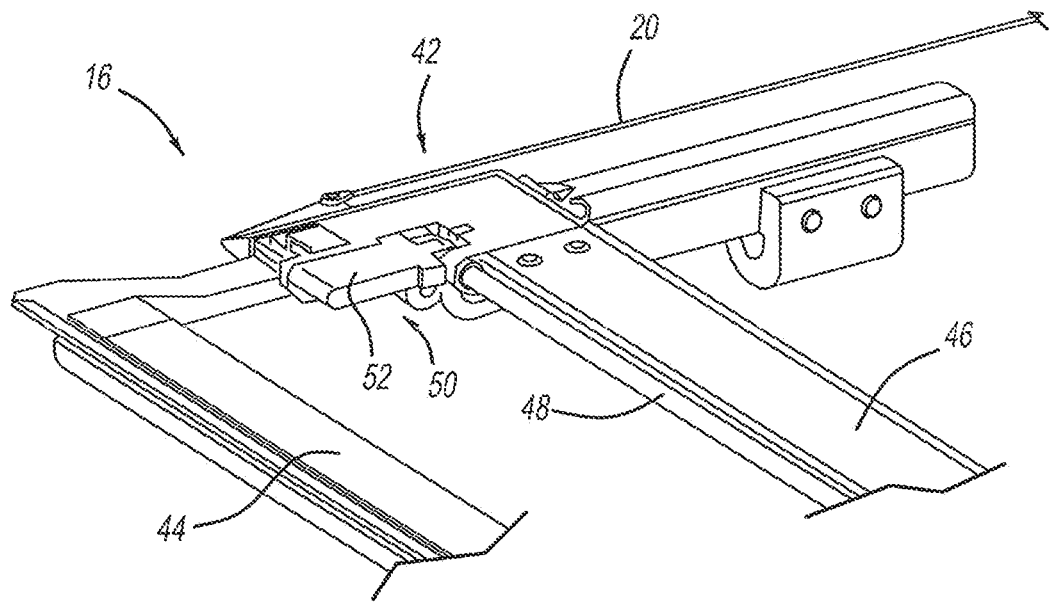
FIG. 6 is an enlarged view of a segment of a rear attachment assembly from FIG. 1 including a rear attachment block connected to a release latch mechanism, in accordance with the present invention.
Figure 7:
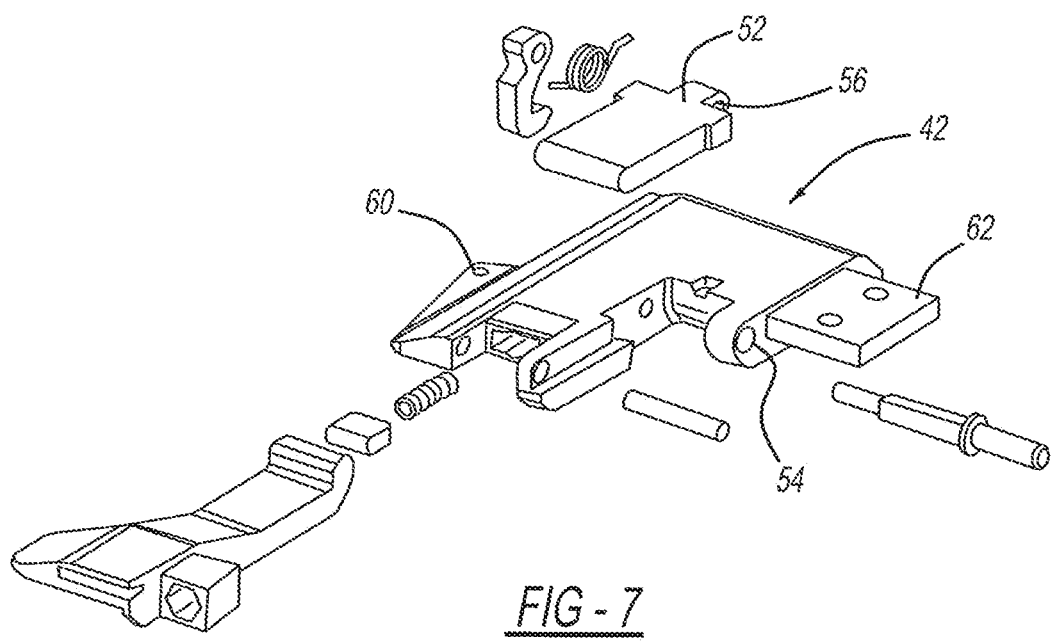
FIG. 7 is an exploded view of the rear attachment block and partial opening feature.

Referring to the Figures generally, and more particularly to FIGS. 3-5, in a preferred embodiment, the attachment arm 28 is generally U-shaped, with two lower depending arms, and is sized to partially fit within an opening 31 formed in the front attachment blocks 24. At least one first fastener 32, e.g., an attachment bolt, is extendable through at least a second aperture 34 provided on one of the lower depending arms of the attachment arm 28 and a third aperture 36 formed in a first brace 38. A second brace 39 is held, e.g., using adhesive, against the inside of the other arm for mounting to the vehicle. Thus, once the first bow 26, or "front bulkhead" referred to interchangeably herein, is put in place on the vehicle and then the fastener 32 is tightened, this draws the attachment arm 28 rearward fixing and sealing the front bulkhead 26 to the bulkhead of the vehicle's bed. In a preferred embodiment, at least one seal is provided on the front attachment assembly 14 and typically seals against the vehicle structure.

The first pair of front attachment blocks are also provided with at least one first mounting bracket 40, preferably two side-by-side, to connect to the first bow 26. In a preferred embodiment, the first mounting brackets 40, 40 slide into the ends of the first bow 26 and fasteners, e.g., bolts, are provided to fix the first bow 26 to the brackets 40, 40.

Referring to the Figures generally, and more particularly to FIGS. 1-2 and 6-7, the rear attachment assembly 16 allows tension to be applied using the cable tension system, eliminating the need for side rails to seal the tonneau cover 12 to the vehicle bed. A pair of rear attachment blocks 42, or "rear tension block" referred to interchangeably herein, are both operably connected to a rear bar 44, cross member 46, and a connector bar 48, which is a release latch connector bar forming part of a release latch mechanism indicated generally at 50. The release latch mechanism 50 has a pair of release latches 52 operably connected to respective rear attachment blocks 42.

Both the right and left hand release latches 52 are tied together so that only one side needs to be operated to open both latches 52. A fourth aperture 54 or a boss is provided on the block of the rear attachment blocks 42 and aligns with a fifth aperture 56 or a boss provided on the release latches 52 for receiving the connector bar 48.

A second cable attachment feature 60, e.g., with a sixth aperture, is formed in either of the rear attachment blocks 42 allowing for mounting locations for the cable tensioning system. The sixth aperture preferably is formed on an outward feature of both of the rear attachment blocks 42 for connecting both the first and second tension cables 20, 22.

The pair of rear attachment blocks 42 are also provided with at least one second mounting bracket 62 to connect to the ends of the cross member 46. In a preferred embodiment the second mounting brackets 62 slide into the ends of the cross member 46 and at least one fastener, e.g., bolts, are provided to fix the cross member 46 to the brackets 62.

Optionally, a pair of rear mounting brackets indicated generally at 64 (see FIGS. 1-2) are used.

Figure 8:
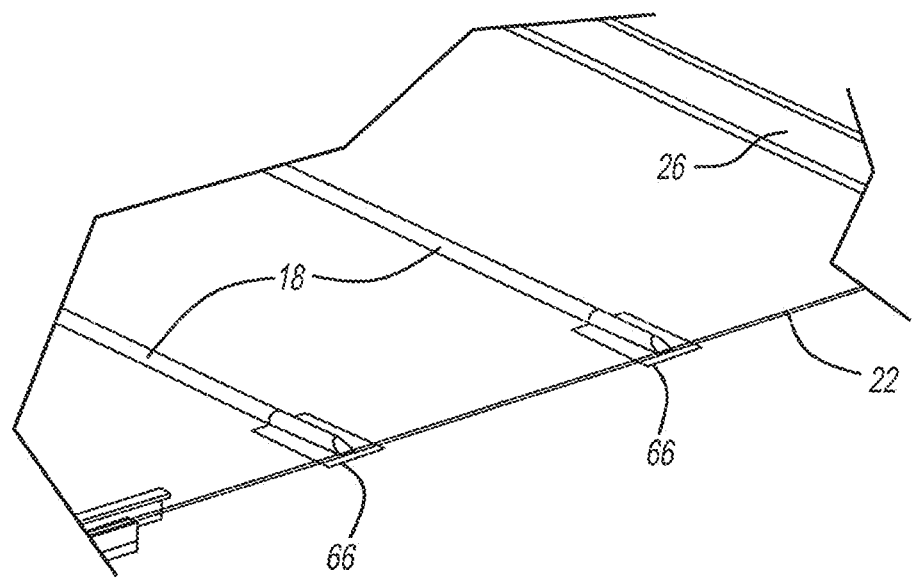
FIG. 8 is an enlarged rear perspective view of a portion of FIG. 1 showing one end of each of a pair of cover management bows pockets.
Figure 9:
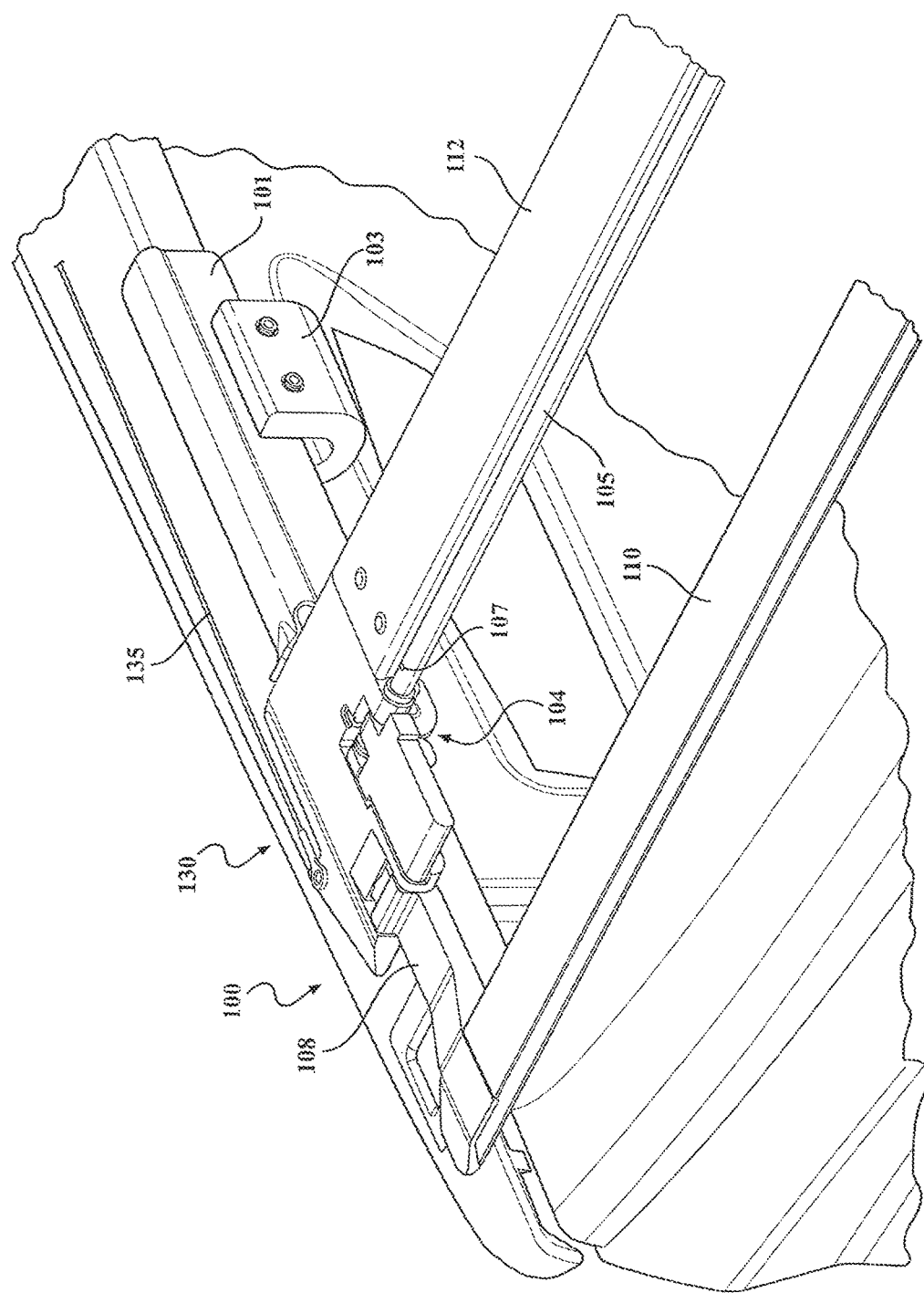
FIG. 9 is a perspective view of a tonneau cover access panel assembly, shown in an exemplary environment of use with the cover material omitted for clarity, according to an embodiment of the present invention.
Figure 10:
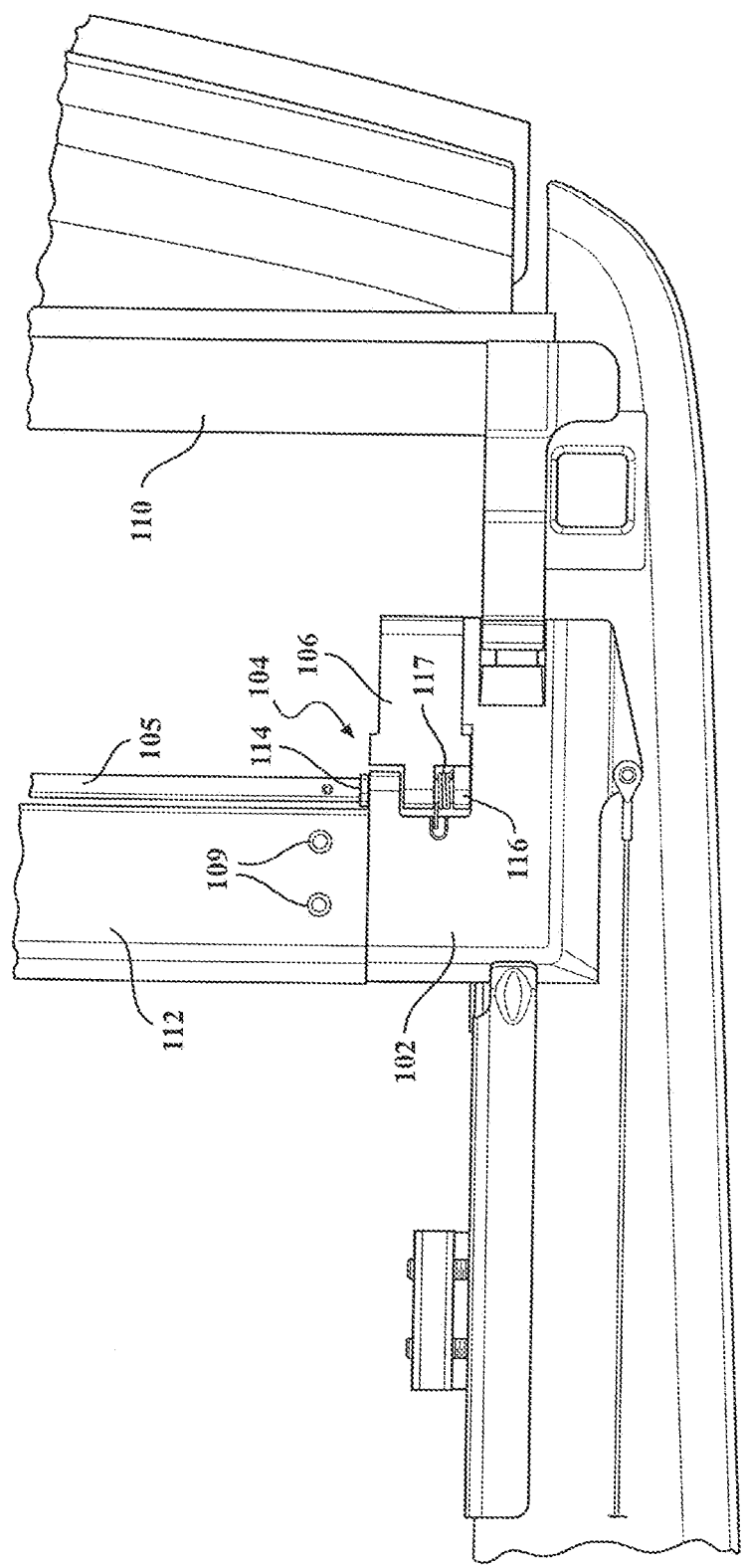
FIG. 10 is a top plan view of the tonneau cover access panel assembly, according to the present invention.
Figure 11:
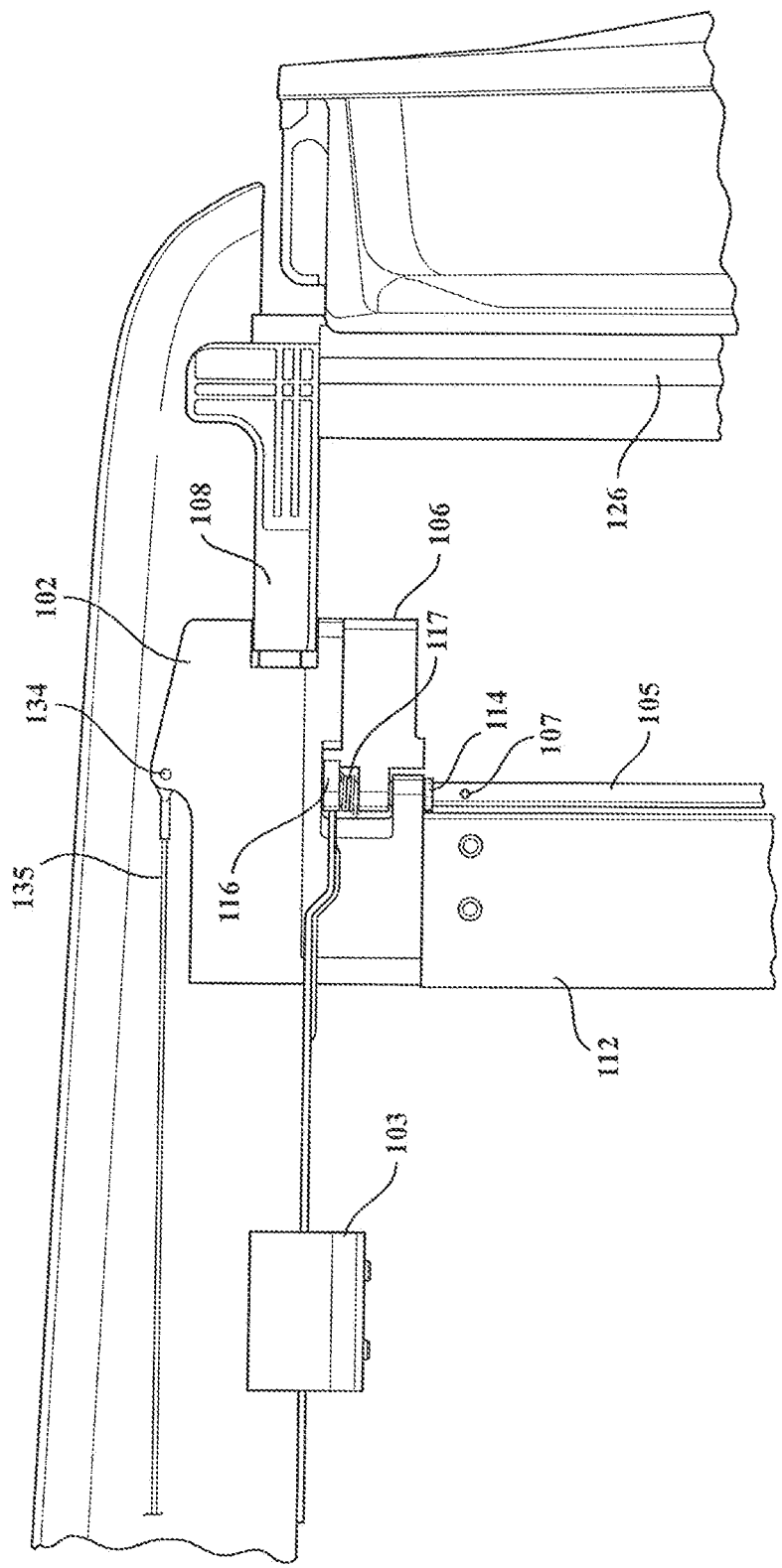
FIG. 11 is a bottom plan view of the tonneau cover access panel assembly, according to the present invention.
Figure 12:
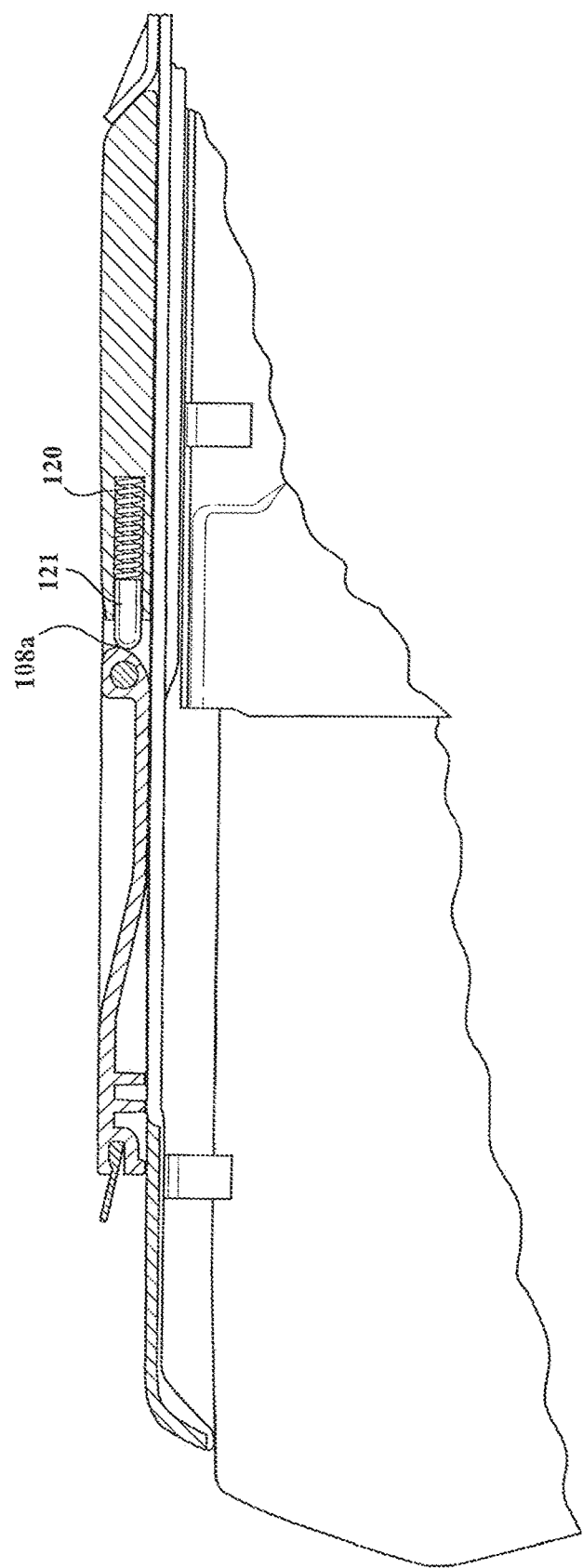
FIG. 12 is a side elevation sectional view of the tonneau cover access panel assembly in a closed position, showing a spring loaded detent, according to the present invention.

Referring to the Figures generally, and more particularly to FIG. 8, where the vehicle and bedrails are omitted for clarity, either of the cover management bows 18 are provided with operably profiled/configured ends for preventing undesirable movement on the existing bed rails. Using a flat edge 66, the ends touch off on the vehicle bed rails setting the height of the bows 18/cover 12. The flat edge 66 sits substantially flat on top of the bedrail such that the bows 18 cannot drop into the bed of the vehicle. An operable predetermined step feature formed in the bottom of the ends helps to set side to side positioning against the vehicle bed sides. By way of example, a step on the bottom drops in and sits just inside the bedrail such that the end cannot move too far either side.

Referring to FIGS. 1-8 generally, the tonneau cover assembly 10 eliminates side rails from the system. In accordance with a preferred embodiment of the present invention, the cable tensioning system incorporates cables 20, 22 used to create cover 12 tension and seal the cover 12 to the vehicle body. The assembly 10 uses the bedside to locate the fabric management bows 18, 18 and cover 12 in their side to side and height orientations. The rear engagement feature, e.g., rear mounting brackets 64, can be an additional bracket (as shown) or incorporated into the bed. The front engagement to the bed feature, e.g., attachment arms 28, are drawing up on the bulkhead to locate/attach/seal. The assembly 10 preferably includes an integrated fabric boot cover to protect the stowed system when rolled and stowed. Depending on the application, alternative stowing methods are contemplated without deviation from the present invention. A significant advantage over conventional systems is the use of connected right and left hand latches 52, 52 on a tonneau cover.

For reference throughout the Figures the term "front" indicates the vehicle cab direction.

Referring to FIGS. 9-20 generally, there is provided a rear tonneau access cover panel assembly shown generally at 100 according to an embodiment of the present invention. The assembly 100 is adapted for attachment, preferably, to mounting points in the cargo bed of the vehicle, which can be any mounting arrangement suitable for durability requirements. The assembly 100 is suitable to meet automotive specifications and functionality.

The assembly 100 has a rear attachment assembly with a pivotal portion shown generally at 111 for moving between a closed position and a first open position to partially uncover the opening into the cargo area. The assembly 100 includes at least one rear attachment portion 102, at least one latch mechanism indicated generally at 104 with a release latch 106 (or "latch handle assembly"), at least one pivotal member 108 with detent, e.g., spring loaded detent, on the pivotal portion 111, and at least one rear mounting mechanism. Any of these features are located on either side of the assembly 100, preferably, on both sides of the assembly. Most preferably, the right half of the assembly 100 and corresponding features are substantially mirror image/symmetrical to the left half of the assembly 100 and corresponding features depicted in the figures. However, the latch mechanism 104 is such that only one of either release latch 106 (or "handle" or "paddle") need be actuated by an operator for the latch mechanism 104 to be disengaged on both sides to allow pivotal movement of the pivotal portion 111, as will be explained in greater detail below.

The assembly 100 also incorporates a front attachment assembly, such as previously described front attachment assembly 14, according to an embodiment of the present invention.

The assembly 100 also includes at least one cover 138, e.g., soft cover, operably connected to at least the pivotal portion 111.

Typically, the assembly 100 has at least one mounting bracket arrangement including a rear mounting bracket 101, e.g., L-shaped bracket, that rests and/or is operably fastened in a U-shaped mounting bracket 103 by a plurality of fasteners. However, depending on the application a portion of the assembly 100 is bolted, screwed, welded, riveted, additionally secured with adhesive and/or epoxy, combinations thereof or otherwise connected to the U-shaped mounting bracket 103, or other suitably shaped bracket, and/or directly to the cargo bed, e.g., side walls of the bed, depending on the application. Preferably, at least one attachment portion 102 or "attachment block" is releasably locked into the vehicle bed via the rear mounting bracket 101.

The tonneau access cover panel assembly 100 is adaptable and incorporates in combination a cable-type assembly (cover is cable tensioned), tri-fold (e.g., cover is segmented and the assembly folds up generally in the direction toward the vehicle cab), roll-up (e.g., the assembly rolls up with the rest of the tonneau, soft panels, hard panels (e.g., two or more smaller hard sections with a living hinge in-line with pivot points), soft tri-fold, hard or rigid, soft or flexible, manual or electric, hybrid, or any other type of tonneau assembly and combinations thereof, depending on the application and predetermined vehicle needs.

The assembly 100 further includes a rear bow 110 and cross member 112. The rear bow 110 is coupled to both pivotal members 108, e.g., by at least one fastener such as a nut and bolt, etc, or, alternatively, integrally formed with the pivotal members 108. The rear bow 110 is also operably coupled to the cover 138 of predetermined tonneau cover material. The rear bow 110 is in sealing engagement with the tailgate for a weather tight seal. The cross member 112 is operably connected to both attachment portions 102, e.g., slid over a mounting member that is formed on the portions 102 and secured by a plurality of fasteners 109.

The pivotal members 108, rear bow 110, and second cross member 112 are made of a metal, preferably, aluminum. However, depending on the particular application, it is also within the scope of the invention to manufacture the pivotal members 108, rear bow 110, and/or cross member 112 of different materials such as steel, composite plastic, or other suitable impact resistant material to withstand predetermined cycling requirements and load without departing from the scope of the invention.

The latch mechanism 104 includes a release latch connector bar 105 having a small rod like structure 114, preferably of metal, that is operably connected, e.g., partially inserted into the connector bar 105, to both ends of the connector bar 105 by at least one fastener 107, e.g., roll pin. Each latch handle assembly 104 includes a hook feature 116 that is biased by a detent mechanism 117, such as a spring, preferably, a torsion spring. The hook 116 locks into a respective corresponding feature 115 in the assembly, e.g., a recess with an abutting surface formed in the mounting member 101, and/or vehicle cargo bed frame. In addition to the connector bar 105, each corresponding rod 114 is also operably coupled to the respective release latch 106 handle, attachment portion 102, hook 116 and spring 117. Preferably, the rod 114 is inserted into holes in these adjacent parts to keep the parts together in operational contact. Alternatively, no rod 114 is used and the connector bar 105 is operably connected to these features.

Lifting or otherwise manipulating one release latch 106, on either end, results in the rotation of both hooks 116 via the connector bar 105 to release the hook connection and release some tension. Thus, a user only needs to operate one latch 106; because of the rod 114 (on both ends)/bar 105, both sides are released allowing for selective rotation by the user to the fully open position and any intermediate position(s). To lock the attachment portion 102 into the closed position, the hooks 116 are brought back into engagement with the abutting surface 115 on the mounting bracket 101 and the pivotal portion 111 is rotated to engagement with the tailgate 142.

Figure 13:
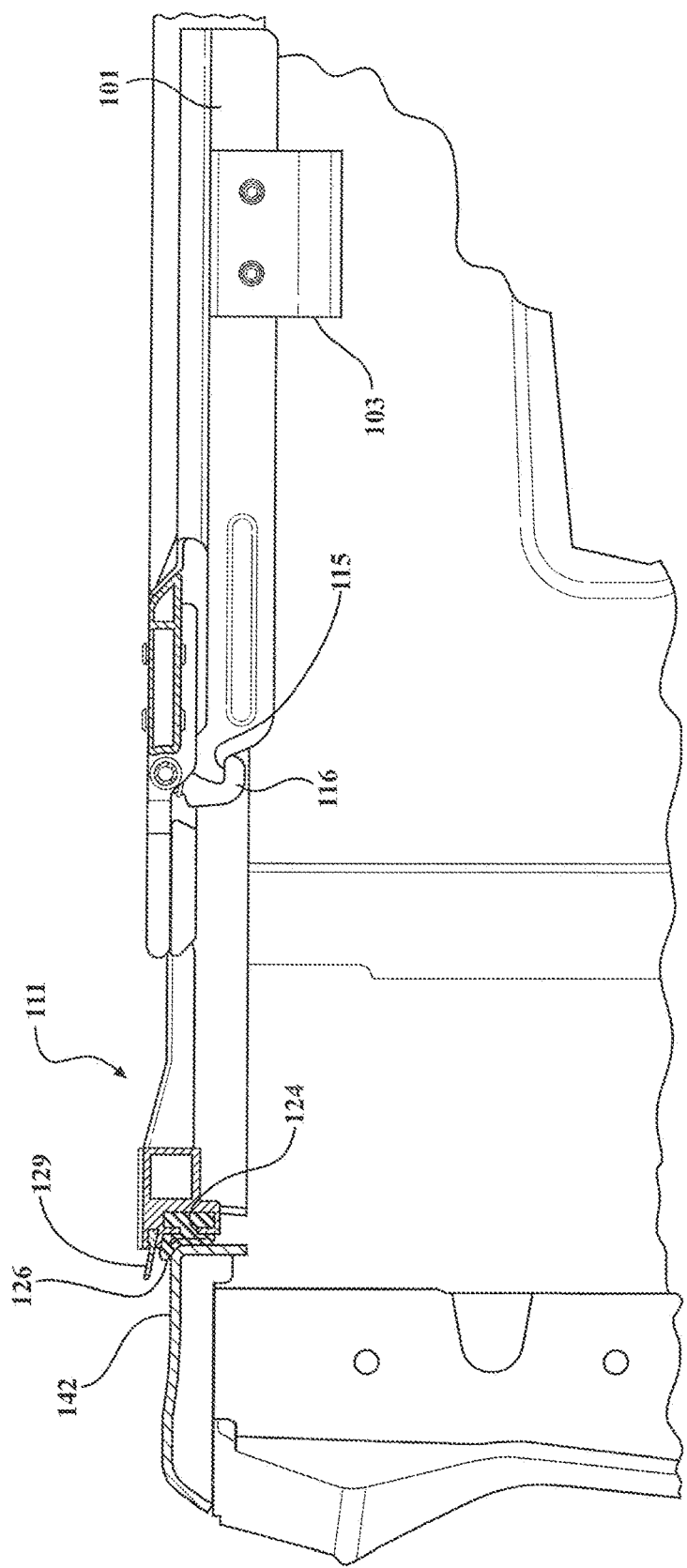
FIG. 13 is a side elevation sectional view of the tonneau cover access panel assembly in a closed position, illustrating a latch mechanism hook, according to the present invention.
Figure 14:
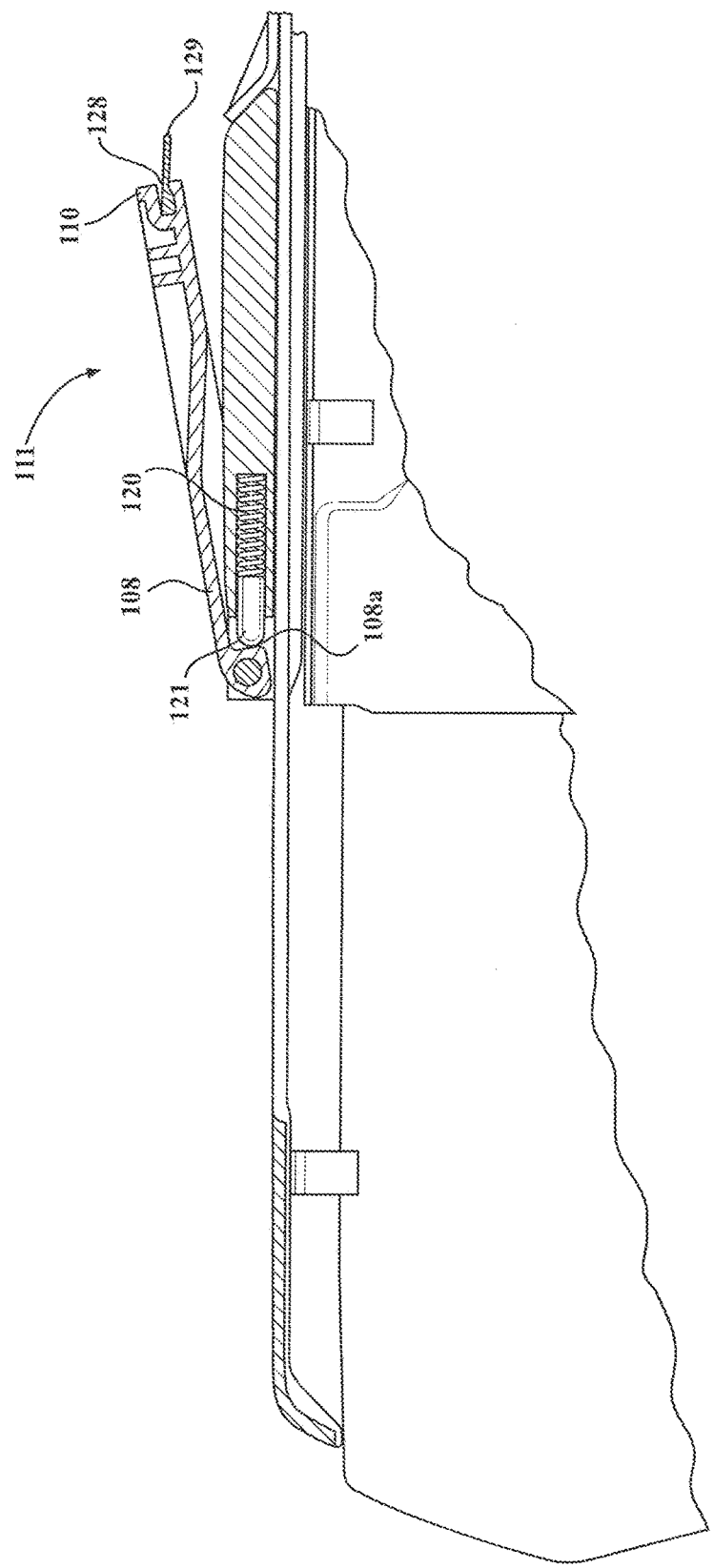
FIG. 14 is a side elevation sectional view of the tonneau cover access panel assembly in an open position, showing a spring loaded detent, according to the present invention.
Figure 15:
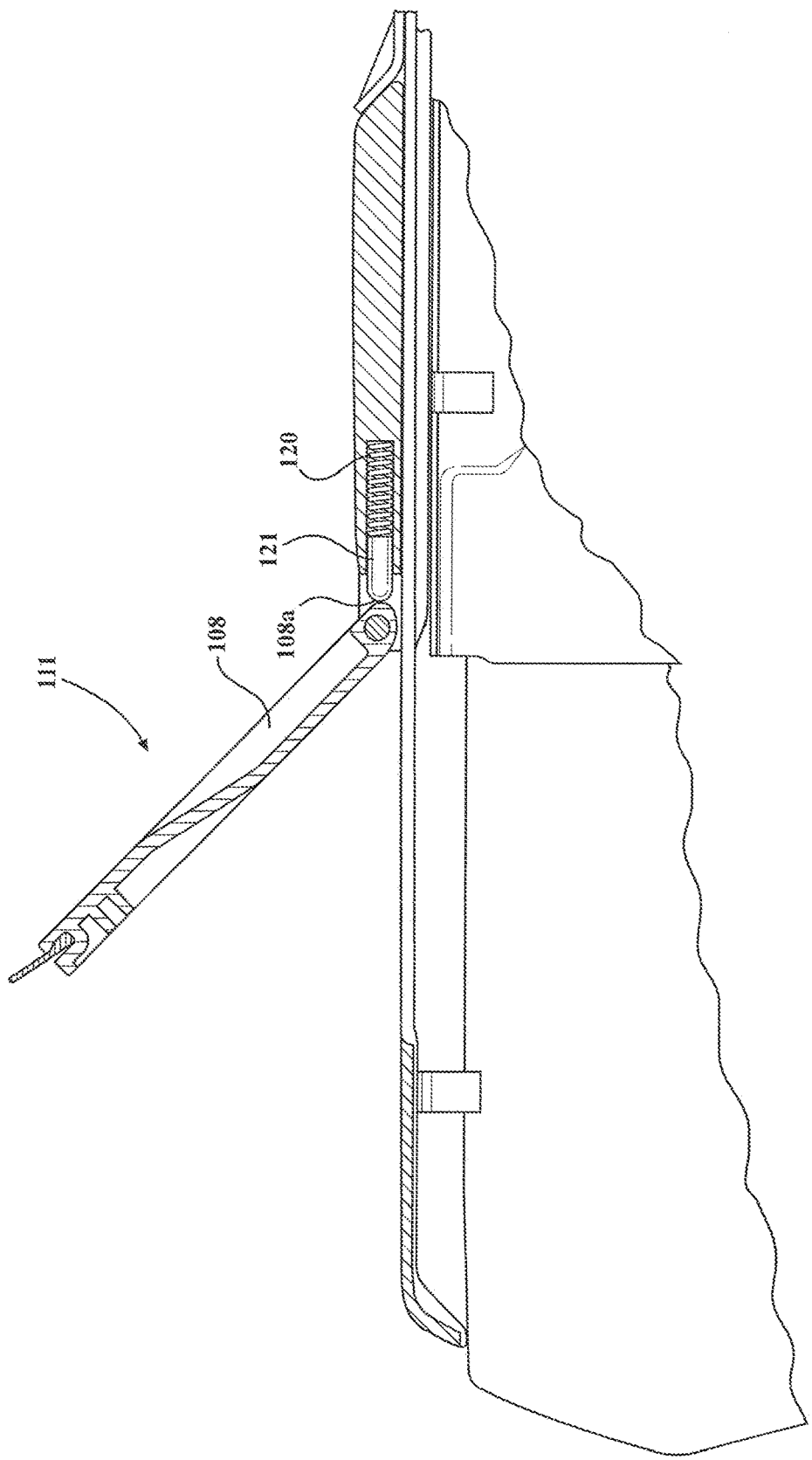
FIG. 15 is a side elevation sectional view of the tonneau cover access panel assembly in an intermediate open position, showing a spring loaded detent, according to the present invention.
Figure 16:
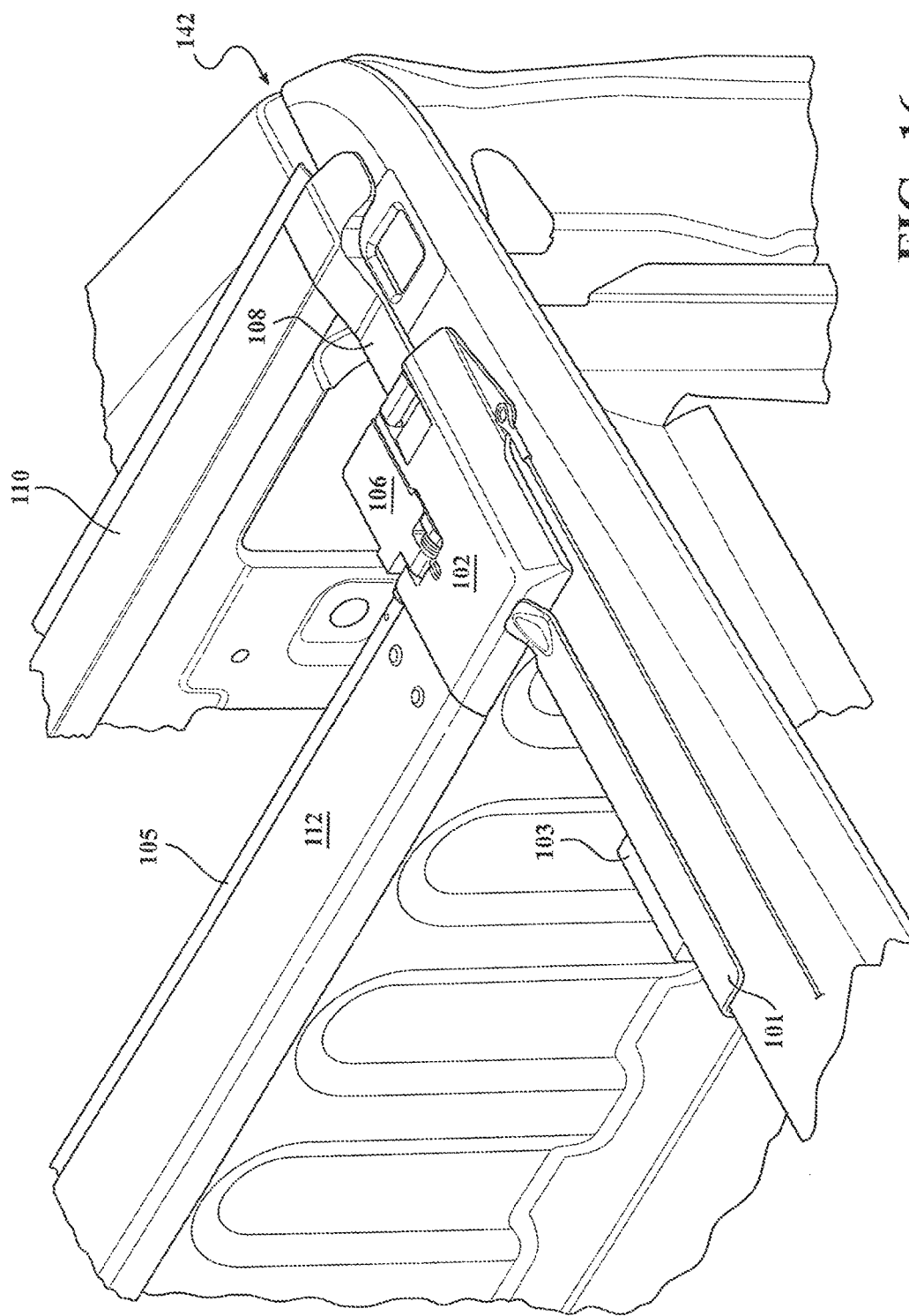
FIG. 16 is a front perspective view of the tonneau cover access panel assembly, depicted in an environment of use adjacent a tailgate, according to the present invention.
Figure 17:
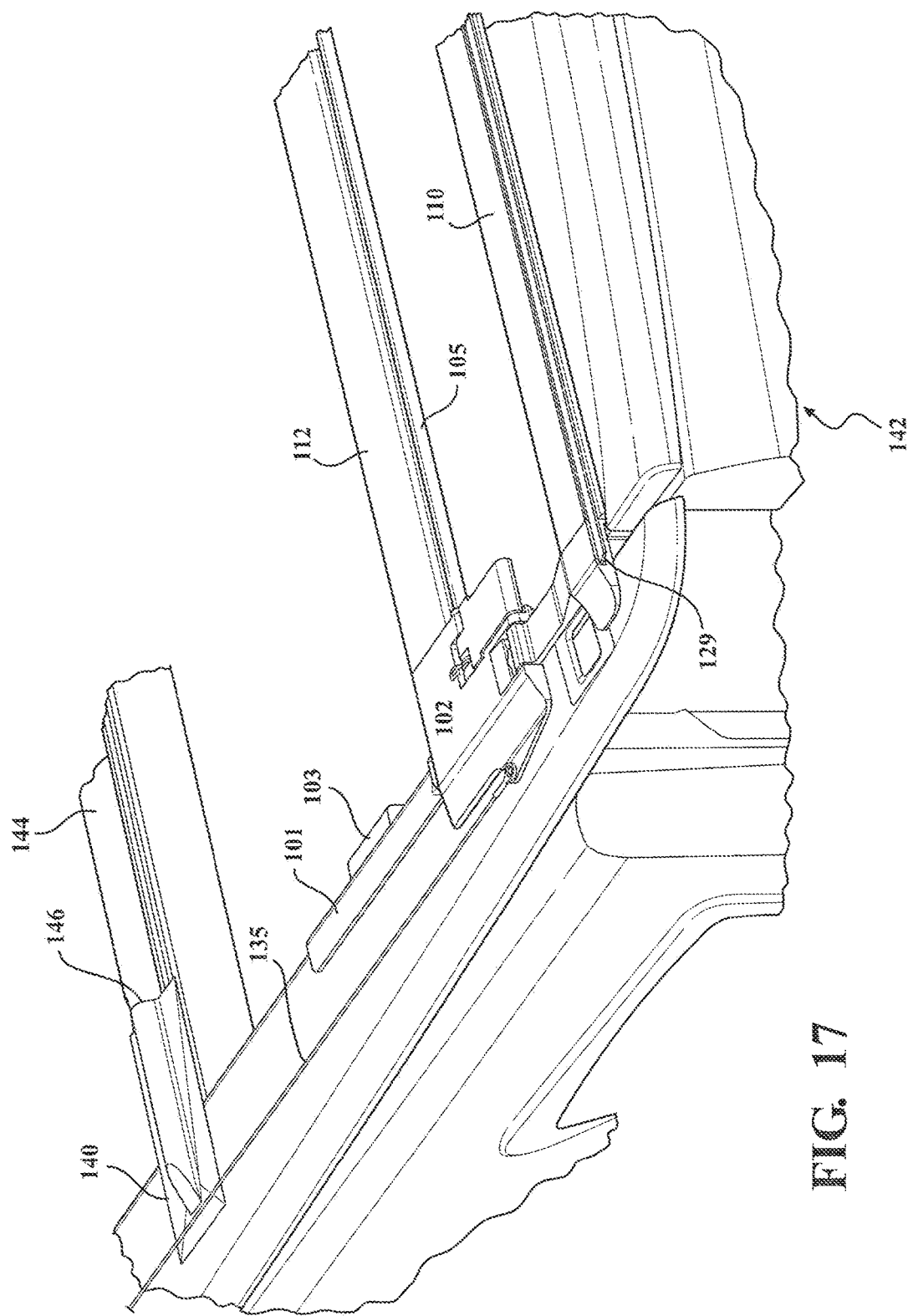
FIG. 17 is a rear perspective view of the tonneau cover access panel assembly in a closed position, and shows a bow pocket, according to the present invention.
Figure 18:
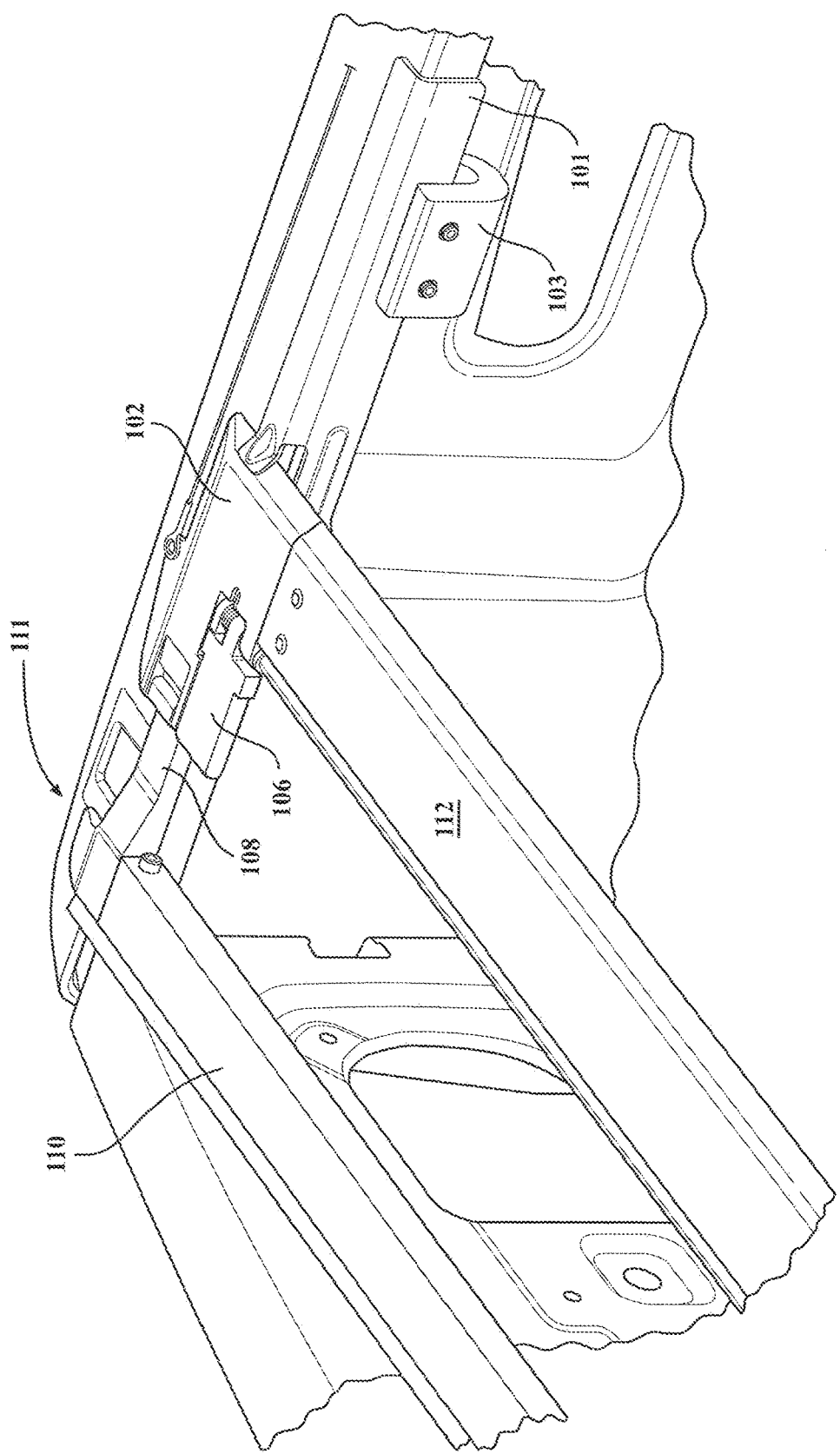
FIG. 18 is a rear isometric view of the tonneau cover access panel assembly in a closed position, according to the present invention.

The pivotal portion's 111 pivot members 108 are pivotally connected to the attachment portion 102 by a second pin 118 or metal rod and has a spring loaded detent. The combination of a spring 120 backing an anterior block 121 against a posterior surface 108a of the pivotal members 122 locks the pivotal member 108 in up/down positions (open/closed). This also serves to prevent the pivotal members 108/rear bow 110 from bouncing in the open and/or closed positions during vehicle transit. Preferably, the spring 120 is a compression spring. FIG. 13 illustrates a closed position, while FIG. 14 illustrates a first open position. Providing intermediate position(s) is/are contemplated, e.g., such as that shown in FIG. 15 because of the detent surface(s)/spring 120, without departing from the scope of the present invention. FIG. 15 is at about 45 degrees, however, greater or lesser degrees are contemplated.

The rear bow 110 is operably adapted to be in sealing engagement with the tailgate shown generally at 142 (FIG. 13).

According to an embodiment of the present invention, the rear bow 110 includes an operably shaped channel 124 to slidably receive and retain a seal 126. Most preferably, the seal 126 is a bulb seal having at least one bulb. Although an exemplary channel 124 is shown, it is understood that the channel 124 can have any shape suitable for receiving an opposing connecting feature of the seal 126. The seal 126 is slid into the channel 124 and operably held in place by friction and/or at least one fastener and/or at least one other suitable feature to prevent the seal 126 from leaving the channel 124. Preferably, the channel 124 is generally located on the underside of the rear bow 110. Most preferably, channel 124/bulb attaches toward the leading edge of the rear bow 110. The bulb seal 126 goes against a predetermined portion of the tailgate for a weather resistant seal. The spring loaded detent 120/121/108 pushes the pivotal members 108/rear bow 110 in the direction toward the tailgate and therefore pushes the seal 126 against the tailgate.

Generally, the seal 126 is an extruded material of polypropylene, thermoplastic elastomer, soft TPE (Thermoplastic Elastomer), rigid PVC, flexible PVC, PVC vinyl, PVC rubber, ABS, a structural ABS (Acrylonitrile Butadiene Styrene), polypropylene, or other plastic material or other suitable material and combinations thereof suitable for providing a structural portion to remain in the channel 124 and additionally a resilient seal portion, e.g., bulb.

The rear bow 110 also includes an operably shaped second channel 128 to receive a mounting portion of the tonneau cover. Preferably, the mounting portion is an extrusion 129 is sewn to the cover and slid into the second channel 128. The extrusion/cover 128 is held in place by friction and/or at least one fastener and/or at least one other suitable feature to prevent the cover from leaving the second channel 128. Most preferably, no fasteners are used to connect the cover to the channel which is a significant benefit. In one embodiment the channel 128 is generally located on the underside of the rear bow 110 toward a leading edge when in the closed position. This allows the cover to wrap up and around the bow edge and back so that the frame of the assembly 100 is not visible. Preferably, the channel 128 is located on the leading edge of the rear bow 110 when in the closed position. The mounting portion is a predetermined shape received in the channel 128 in the rear bow 110. Other suitable arrangements, P-welts, C-shaped channels, can be used to couple the cover 138 to a bow (such as in known manners described in U.S. Pat. No. 6,322,129 B2 incorporated herein by reference).

According to an embodiment of the present invention, in operation, the user flips the pivotal portion 111 rearward to a first open position to gain partial access to the cargo bed structure. When a larger opening into the structure is desired, the user rotates the release latch 106 in a first direction which disengages the hook 116 from the mounting bracket 101 allowing the pivotal portion 111 with the cover 138 attached to be rolled, or otherwise suitably articulated, as far back toward the front attachment assembly 14 as desired. Rolling the unit all the way to adjacent the front attachment assembly 14 provides a fully uncovered opening into the cargo bed.

In a preferred embodiment, only the mounting bracket arrangement with the rear mounting bracket 101 and mounting bracket 103 stays in the affixed position after unlatching the hooks 116 allowing selective rotation of the rest of the assembly to a fully open position, e.g., positioned adjacent the cab for greatest access into the cargo bed. In a preferred embodiment, once the hooks 116 are unlatched, the cover with the attached pivotal portion 111 is able to be rolled up and stowed toward the front attachment assembly 14. Straps can be used to keep the rolled assembly 100 in the fully open position and/or any intermediate open position(s).

According to the present invention, there are predetermined desired positions of the assembly 100 with predetermined amounts of access into the cargo bed of the vehicle indicated generally at 130. The assembly 100, preferably the rear bow 110, is in sealing engagement against the tailgate 142 in a closed position. When in the first open position, the pivotal portion 111 has been pivoted back to create an opening of predetermined width, e.g., not more than 6 inch opening. In one or more predetermined deployed position(s) the assembly 100 is provided in combination with a tri-fold cover or any other type of tonneau cover assembly, and when deployed, an opening of predetermined width, e.g., quarter, half, and/or full top access into the cargo bed. These examples are exemplary and not limiting.

Generally, when the assembly 100 is in the first open position the width of the opening into the bed is at least 3 inches, typically 3-10 inches, preferably 4-8 inches, most preferably about 6 inches.

In one embodiment, another safety advantage option of the present invention is that the assembly 100 cannot be operated unless the tailgate is unlatched and/or unlocked.

In one preferred embodiment, a cable attachment feature 134 is provided on the attachment portion 102 for attaching cable(s) 135 for a cable tonneau cover assembly. Preferably, the cable 135 is not a hard attachment to the vehicle to help manage the cable/cover/sealing. The cable 135 eliminates Velcro hook and loop for sealing, which is a significant benefit over conventional systems. Rather, the cable 135 holds the cover 138 taut as desired along at least the outboard sides of the cover 138. The cable 135 is also attached to at least the front attachment assembly 14, e.g., to the attachment block 24. Other attachment point(s) are contemplated depending on the application without departure from the scope of the present invention. Other cable-type arrangements are contemplated depending on the application without departure from the scope of the present invention.

Figure 19:
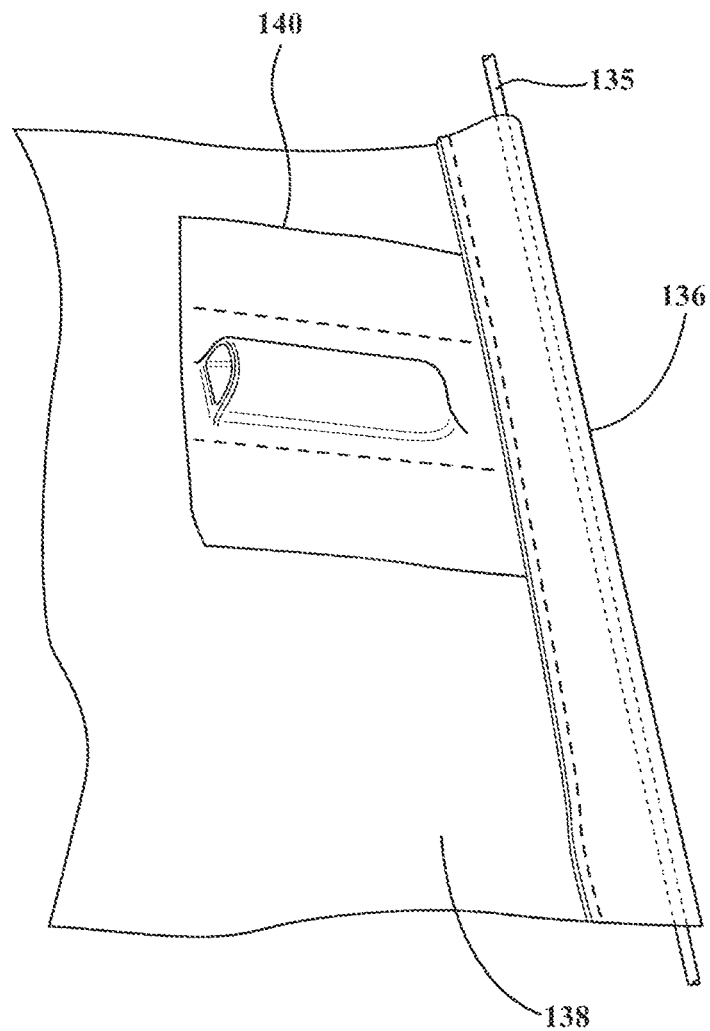
FIG. 19 is bottom perspective view of a bow pocket connected to a section taken of the cover, according to the present invention.

Referring more particularly to FIG. 19, the cable is located within a cable pocket 136, where the cable pocket 136 is sewn and/or adhered along the outer edge of the cover 138.

Preferably, a plurality of pockets 140 are provided to hold both ends of center management bow(s) 144. There are provided at least one, preferably at least two, most preferably at least three, center management bows 144. The bows 144 set the height and eliminate aluminum rails and attachment features, which such rails are conventionally required. The center management bows 144 also assist with cover management. The pockets 140 have a predetermined suitable height and width depending on the application. The pockets 140 also set the distance between each center management bow 144. The center management bows 144 run cross-car. The cable pocket 136 preferably runs past outwardly from the pockets 140 for center management bows 144.

When the top cover is fabric or other flexible material these pockets 140, most preferably, of molded acrylonitrile butadiene styrene (ABS), having predetermined suitable thickness, are sewn and/or adhered to at least the cover. The pockets 140 are on the underside surface of the cover 138, thus not visible when the cover 138 is in the closed position. Each end of the center management bows 144 are slid into an opening 146 in a respective pocket 136. Preferably, the pockets 140 rest on existing original manufacturer bed features/rails and sets the height and cross-car relative to the bed. The pockets 140 sets the height and are thin enough to sew to the cover material. The pockets 140 set the distance between the bows 144 and, in combination with the bows 144, help with moving the assembly to a fully open position and any intermediate open position(s), e.g., to help with rolling the cover/assembly. The pockets 140 also eliminate the addition of aluminum rails for the cover and eliminate the tongue and loop for cover sealing, which are significant advantages.

While a cable-type tonneau cover assembly is depicted in the figures, the assembly 100 can be used in combination with any type of tonneau cover assembly without departing from the scope of the present invention.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A rear cover access panel system for a vehicle having a cargo area structure with at least one opening, comprising:
   at least one attachment portion selectively operably coupled to the vehicle;
   a pivotal portion pivotally coupled to the at least one attachment portion;
   a cover attached to the pivotal portion where pivoting the pivotal portion allows the cover to move between a closed position covering the opening of the vehicle and a first open position partially uncovering the opening of the vehicle; and
   at least one latch mechanism operably coupled to the at least one attachment portion, said at least one latch mechanism operably selectively releases the at least one attachment portion from the vehicle to allow further uncovering of the opening as desired.

2. The rear cover access panel system of claim 1, further comprising at least one mounting bracket attached to the vehicle with at least one fastener, wherein the at least one attachment portion is selectively coupled to the at least one mounting bracket by the at least one latch mechanism, wherein manually releasing the at least one latch mechanism disengages the at least one latch mechanism from the at least one mounting bracket.

3. The rear cover access panel system of claim 2, wherein the at least one latch mechanism includes a latch having a hook that engages an abutting surface of the at least one mounting bracket to lock the at least one attachment portion in the closed position, and, wherein releasing the latch disengages the hook from the at least one mounting bracket to allow the cover to be moved to a fully open position.

4. The rear cover access panel system of claim 1, further comprising a plurality of center management bows operably connected to the cover to manage the movement of the cover.

5. The rear cover access panel system of claim 4, further comprising a plurality of pockets operably connected to the cover for holding the center management bow ends.

6. The rear cover access panel system of claim 5, wherein the plurality of pockets are arranged relative to the cargo area structure near the opening to set a predetermined height of the cover.

7. The rear cover access panel system of claim 1, wherein assembly does not require rails for coupling to the cargo area structure.

8. The rear cover access panel system of claim 1, further comprising at least one front attachment assembly in sealing engagement with the vehicle and operably connected to the front end of the cover.

9. The rear cover access panel system of claim 8, further comprising a cable coupled to both sides of the cover respectively, wherein the cable is connected to at least the front bow assembly and attachment portion to provide tension to the cover.

10. The rear cover access panel system of claim 1, further comprising a tensioning system operable to provide tension to the cover for a weather resistant seal with the cargo bed area.

11. The rear cover access panel system of claim 1, wherein the cover is selected from the group consisting of a cable tonneau cover assembly, tri-fold tonneau cover assembly, roll-up tonneau cover assembly, soft tri-fold tonneau cover assembly, hard panel hinged tonneau cover assembly, and combinations thereof.

12. A tonneau cover access panel system for a vehicle having a cargo bed structure with at least one top opening and a tailgate, comprising:

a pair of mounting brackets operably connected to the vehicle;

a pair of attachment portions selectively coupled to the pair of mounting brackets;

a pivotal portion with a spring loaded detent pivotally connected to the pair of attachment portions and in sealing engagement with the tailgate;

a cover operably coupled to the pivotal portion, where pivoting the pivotal portion allows the cover to move between a closed position and a first open position partially uncovering the at least one opening; and a pair of latch mechanisms operably coupled to the pair of attachment portions, wherein rotating at least one of the latch mechanisms in a first direction releases both latch mechanisms from the pair of mounting brackets to allow further uncovering of the opening as desired.

13. The tonneau cover access panel system of claim 12, further comprising a channel formed in a rear bow of the pivotal portion as an attachment for the cover.

14. The tonneau cover access panel system of claim 12, wherein the pivotal portion further comprises at least one seal to seal against the tailgate of the vehicle.

15. The tonneau cover access panel system of claim 12, further comprising a plurality of center management bows that manage the movement of the cover and set the height of the cover.

16. The tonneau cover access panel system of claim 12, wherein the first open position provides an opening of about 3 to 8 inches into the cargo bed structure.

17. The tonneau cover access panel system of claim 12, further comprising a cable tensioning system to hold the cover taut in the closed position.

* * * * *